(12) United States Patent
Li et al.

(10) Patent No.: US 10,740,797 B2
(45) Date of Patent: Aug. 11, 2020

(54) SYSTEMS AND METHODS FOR IMPLEMENTING A MOBILE APPLICATION BASED ONLINE ADVERTISING SYSTEM

(71) Applicant: Yahoo Holdings, Inc., Sunnyvale, CA (US)

(72) Inventors: Wentong Li, Saratoga, CA (US); Yi Mao, Sunnyvale, CA (US)

(73) Assignee: Oath Inc., New York, NY (US)

( * ) Notice: Subject to any disclaimer, the term of this patent is extended or adjusted under 35 U.S.C. 154(b) by 907 days.

(21) Appl. No.: 13/953,025

(22) Filed: Jul. 29, 2013

(65) Prior Publication Data

US 2014/0032302 A1    Jan. 30, 2014

Related U.S. Application Data

(60) Provisional application No. 61/677,118, filed on Jul. 30, 2012.

(51) Int. Cl.
*G06Q 30/00* (2012.01)
*G06Q 30/02* (2012.01)

(52) U.S. Cl.
CPC ..... *G06Q 30/0267* (2013.01); *G06Q 30/0251* (2013.01); *G06Q 30/0261* (2013.01); *G06Q 30/0271* (2013.01)

(58) Field of Classification Search
CPC .......... G06Q 30/0267; G06Q 30/0261; G06Q 30/0271; G06Q 30/0251
USPC .......... 705/14.49, 14.58, 14.64, 14.66, 14.67
See application file for complete search history.

(56) References Cited

U.S. PATENT DOCUMENTS

| | | | | |
|---|---|---|---|---|
| 6,993,326 B2* | 1/2006 | Link, II | ................. | G06Q 30/02 455/414.1 |
| 7,418,454 B2* | 8/2008 | Chen | ................... | H04L 67/2804 |
| 8,126,779 B2* | 2/2012 | Wanker | .................. | G06Q 30/02 705/26.1 |
| 8,160,925 B2* | 4/2012 | Anand | ................... | G06Q 30/02 705/14.49 |

(Continued)

FOREIGN PATENT DOCUMENTS

| | | |
|---|---|---|
| JP | 2008-040613 | 2/2008 |
| WO | WO 2005/024667 A1 | 3/2005 |

OTHER PUBLICATIONS

Tripathi, Arvind K. et al. "Narrowcasting of Wireless Advertising in Malls." European Journal of Operational Research, vol. 182, Issue 3. pp. 1023-1038, Nov. 2007. (Year: 2007).*

(Continued)

*Primary Examiner* — Luis A Brown
(74) *Attorney, Agent, or Firm* — Cooper Legal Group, LLC (57) ABSTRACT

A system may provide for mobile application based online advertising via mobile application interface. A database may be configured to store data corresponding to a plurality of visual elements for rending an advertisement. An advertising server may be in operative communication with the database and configured to receive requests for advertisement campaigns. A mobile interface may allow submission of information relating to an advertisement campaign to the advertising server. A generator engine may be configured to select from the plurality of visual elements and generate display logic for displaying an advertisement corresponding to the advertisement campaign.

20 Claims, 6 Drawing Sheets

(56) References Cited

U.S. PATENT DOCUMENTS

| | | | | |
|---|---|---|---|---|
| 8,200,661 B1* | 6/2012 | Pearce | G06F 16/9535 | 707/721 |
| 8,560,537 B2* | 10/2013 | Ramer | G06Q 30/02 | 705/14.53 |
| 8,577,724 B1* | 11/2013 | Gandhi | G06Q 30/0241 | 705/14.49 |
| 8,942,995 B1* | 1/2015 | Kerr | H04W 4/021 | 463/25 |
| 2002/0095333 A1* | 7/2002 | Jokinen | G06Q 30/02 | 705/14.26 |
| 2003/0101449 A1* | 5/2003 | Bentolila | G06Q 30/0251 | 725/10 |
| 2004/0181598 A1* | 9/2004 | Paya | G06F 16/9574 | 709/227 |
| 2006/0036875 A1* | 2/2006 | Karoubi | G06F 21/6263 | 713/191 |
| 2006/0184421 A1* | 8/2006 | Lipsky | G06Q 30/02 | 705/14.42 |
| 2007/0038516 A1* | 2/2007 | Apple | G06Q 30/02 | 705/14.42 |
| 2007/0168254 A1* | 7/2007 | Steelberg | H04L 67/20 | 705/14.61 |
| 2007/0192189 A1* | 8/2007 | Popowich | G06Q 30/02 | 705/14.49 |
| 2007/0239722 A1* | 10/2007 | Phillips | G06F 16/9535 | |
| 2007/0271511 A1* | 11/2007 | Khopkar | G06F 40/106 | 715/234 |
| 2007/0282688 A1* | 12/2007 | Buhrow | G06Q 30/02 | 705/14.67 |
| 2008/0046581 A1* | 2/2008 | Molina | H04L 63/08 | 709/229 |
| 2008/0077505 A1* | 3/2008 | Ilechko | G06Q 10/02 | 705/5 |
| 2008/0102947 A1* | 5/2008 | Hays | A63F 13/12 | 463/31 |
| 2008/0172455 A1* | 7/2008 | Masucci | G06Q 30/02 | 709/203 |
| 2008/0189169 A1* | 8/2008 | Turpin | G06Q 30/02 | 705/7.33 |
| 2008/0227467 A1* | 9/2008 | Barnes | G06Q 30/0259 | 455/456.2 |
| 2008/0235243 A1* | 9/2008 | Lee | G06F 16/9535 | |
| 2008/0249832 A1* | 10/2008 | Richardson | G06Q 30/02 | 705/14.46 |
| 2008/0250464 A1* | 10/2008 | Masucci | G06Q 30/02 | 725/82 |
| 2008/0263578 A1* | 10/2008 | Bayer | G06Q 30/02 | 725/9 |
| 2008/0294577 A1* | 11/2008 | Agarwal | G06Q 10/00 | 706/12 |
| 2009/0006201 A1* | 1/2009 | Faseler, Jr. | G06Q 30/0267 | 705/14.73 |
| 2009/0024551 A1* | 1/2009 | Agrawal | G06N 5/02 | 706/47 |
| 2009/0070334 A1* | 3/2009 | Callahan | G06F 21/604 | |
| 2009/0076907 A1* | 3/2009 | Litwin | H04N 21/266 | 705/14.69 |
| 2009/0094196 A1* | 4/2009 | Piwowarski | G06F 16/954 | |
| 2009/0150213 A1* | 6/2009 | Cyr | G06Q 10/10 | 705/7.31 |
| 2009/0198608 A1 | 8/2009 | Jain et al. | | |
| 2009/0234738 A1* | 9/2009 | Britton | G06Q 30/02 | 705/14.5 |
| 2009/0271414 A1* | 10/2009 | Benson | H04L 67/02 | |
| 2009/0313120 A1* | 12/2009 | Ketchum | G06Q 30/02 | 705/14.51 |
| 2010/0023581 A1* | 1/2010 | Lahav | G06Q 30/02 | 709/203 |
| 2010/0076670 A1* | 3/2010 | Turner | G06Q 30/0246 | 701/117 |
| 2010/0106556 A1* | 4/2010 | Vee | G06Q 10/04 | 705/7.22 |
| 2010/0125665 A1* | 5/2010 | Simpson | G06F 11/3409 | 709/224 |
| 2010/0198655 A1* | 8/2010 | Ketchum | G06Q 20/10 | 705/14.58 |
| 2010/0228710 A1* | 9/2010 | Imig | G06F 16/9535 | 707/706 |
| 2010/0235219 A1* | 9/2010 | Merrick | G06Q 10/04 | 705/7.38 |
| 2010/0274628 A1* | 10/2010 | Kunz | G06Q 30/02 | 705/14.53 |
| 2010/0293057 A1* | 11/2010 | Haveliwala | G06F 16/9535 | 705/14.66 |
| 2010/0323716 A1* | 12/2010 | Jaffri | G06Q 30/02 | 455/456.1 |
| 2010/0325276 A1* | 12/2010 | Aarni | G06F 9/54 | 709/226 |
| 2010/0332310 A1* | 12/2010 | Russell | G06Q 30/02 | 705/14.36 |
| 2011/0022461 A1* | 1/2011 | Simeonov | G06Q 30/02 | 705/14.49 |
| 2011/0106616 A1* | 5/2011 | Bigby | G06Q 30/02 | 705/14.49 |
| 2011/0119136 A1* | 5/2011 | Eldreth | G06Q 30/02 | 705/14.69 |
| 2011/0131205 A1* | 6/2011 | Iyer | G06F 16/3334 | 707/728 |
| 2011/0137953 A1* | 6/2011 | Bobick | G06F 8/60 | 707/799 |
| 2011/0145063 A1* | 6/2011 | Qureshi | G06Q 30/02 | 705/14.52 |
| 2011/0161162 A1* | 6/2011 | Ketchum | G06Q 30/02 | 705/14.43 |
| 2011/0196721 A1* | 8/2011 | Addante | G06Q 30/02 | 705/14.4 |
| 2011/0196747 A1* | 8/2011 | Karidi | G06Q 30/02 | 705/14.71 |
| 2011/0209168 A1* | 8/2011 | Shusman | G06Q 30/02 | 725/13 |
| 2011/0225026 A1* | 9/2011 | Ketchum | G06Q 30/02 | 705/14.4 |
| 2011/0276392 A1* | 11/2011 | Vaver | G06Q 30/02 | 705/14.43 |
| 2011/0302236 A1* | 12/2011 | Shrum, Jr. | H04N 21/2343 | 709/203 |
| 2011/0302274 A1* | 12/2011 | Lee | H04N 21/25816 | 709/217 |
| 2012/0005028 A1* | 1/2012 | Stone | G06Q 30/0275 | 705/14.71 |
| 2012/0041823 A1* | 2/2012 | Khan | G06Q 30/0267 | 705/14.64 |
| 2012/0041825 A1* | 2/2012 | Kasargod | G06Q 30/02 | 705/14.68 |
| 2012/0042001 A1* | 2/2012 | Carter | G06Q 10/10 | 709/202 |
| 2012/0047005 A1* | 2/2012 | Connelly | G06Q 30/0241 | 705/14.4 |
| 2012/0047011 A1* | 2/2012 | Rippetoe | G06Q 30/02 | 705/14.45 |
| 2012/0047013 A1* | 2/2012 | Bigby | G06Q 30/02 | 705/14.52 |
| 2012/0054627 A1* | 3/2012 | Priyadarshan | G06Q 30/02 | 715/738 |
| 2012/0166273 A1* | 6/2012 | Zadikario | G06Q 30/0246 | 705/14.45 |
| 2012/0170750 A1* | 7/2012 | Orsini | H04L 9/085 | 380/277 |
| 2012/0253945 A1* | 10/2012 | Gao | G06Q 30/0275 | 705/14.71 |
| 2012/0271684 A1* | 10/2012 | Shutter | G06Q 30/02 | 705/14.1 |
| 2012/0303805 A1* | 11/2012 | Simpson | G06F 11/3409 | 709/224 |
| 2012/0310729 A1* | 12/2012 | Dalto | G06Q 30/02 | 705/14.43 |
| 2013/0080242 A1* | 3/2013 | Alhadeff | G06Q 30/0239 | 705/14.39 |

(56) References Cited

U.S. PATENT DOCUMENTS

| | | | |
|---|---|---|---|
| 2013/0085838 A1* | 4/2013 | Tennenholtz | G06Q 10/04 |
| | | | 705/14.41 |
| 2013/0159113 A1* | 6/2013 | McClelland | G06Q 30/02 |
| | | | 705/14.66 |
| 2014/0006172 A1* | 1/2014 | Pardoe | G06Q 30/08 |
| | | | 705/14.71 |
| 2014/0012659 A1* | 1/2014 | Yan | G06Q 30/0241 |
| | | | 705/14.42 |

OTHER PUBLICATIONS

International Preliminary Report on Patentability for corresponding International Application No. PCT/US2013/052489 dated Feb. 3, 2015.

* cited by examiner

SYSTEMS AND METHODS FOR IMPLEMENTING A MOBILE APPLICATION BASED ONLINE ADVERTISING SYSTEM

PRIORITY CLAIM

This application claims the benefit of U.S. Provisional Patent Application No. 61/677,118, filed on Jul. 30, 2012, and which is incorporated by reference herein in its entirety.

BACKGROUND

The present description relates generally to systems and methods for implementing a mobile application based online advertising system. More particularly, the mobile application based online advertising system is related to a management and workflow for online advertising, especially providing an application programming interface (API) for generating and displaying advertising or broadcasting campaigns that is accessible from mobile applications on smart phones, tablets, personal digital assistants (PDA), and the like.

Online advertising has become an increasingly popular way for advertisers to publicize information about goods and services to potential customers and clients. An advertiser can implement an advertising campaign using internet-accessible facilities of online providers such as Yahoo! Inc. The online provider serves to connect the advertiser with users accessing online resources such as search engines and news and information sites. Advertisements ("ads") of the advertiser are provided to the users to inform and attract the attention of the users.

The online provider may make available a variety of advertiser tools to create and manage an advertising campaign. The advertiser may make use of these tools by accessing web sites of the online provider. Tools for creating an advertising campaign allow the advertiser to specify such parameters such as an ad budget, ad timing, and target audience. Some tools also allow the advertiser to create and specify the advertising creatives to be used in online advertisements and in accordance with ad formatting rules and requirements. Advertising creatives are graphics, text, sound and video that are developed to attract the attention of an audience. Other advertiser tools allow the advertiser to manage a campaign by viewing statistics about the progress and success of the campaign and to vary the parameters and details of the campaign as it progresses.

Due partly to their complexity and complicated workflow, advertiser tools are conventionally limited to websites accessible from PC-based web browsers. The complex nature of the online advertising workflow of existing advertiser tools often requires extensive knowledge and familiarity with the online tool in order to create and submit advertisement campaigns. However, recent trends in sales of consumer trends show a dramatic shift from use of personal computers to conduct e-commerce toward a preference for smartphones or tablet computers. As tablets and mobile phones play an increased role in the life of consumers and advertisers alike, there is reduced preference to utilize the complex advertising tools currently made available by advertisers. Further limitations and disadvantages of conventional and traditional approaches will become apparent to one of skill in the art, through comparison of such systems with some aspects of the disclosure set forth in the remainder of the present application with reference to the drawings.

SUMMARY

In accordance with the systems, products, and methods described herein, a mobile application based interface is provided for generating an online advertisement. A database is provided, which stores data related to a plurality of visual display elements for rendering an advertisement. An advertising server is in operative communication with the storage device. The advertising server is configured to receive information related to the creation of an advertisement campaign from a mobile device interface. A generator engine analyzes the information related to the submitted advertisement campaign and selects a plurality of visual elements to generate display logic for the advertisement. The generated advertisement may then be stored and served to target mobile devices based on a number of criteria, geographic and otherwise, submitted during the creation of the advertising campaign.

Additional systems and methods described herein provide for generating application based messaging services that may have certain social computing applications. A database is provided, which is configured to store data related to a plurality of visual display elements for displaying a user broadcast. A server is in operative communication with the database. The server receives information related to the creation of a broadcast campaign from a mobile device interface. A generator engine analyzes the information related to the submitted broadcast campaign and selects a plurality of visual elements to generate display logic for a broadcast. The generated broadcast may then be stored and served to target mobile devices based on a number of criteria, geographic, social and otherwise, submitted during the creation of the messaging campaign.

Other systems, methods, features and advantages will be, or will become, apparent to one with skill in the art upon examination of the following figures and detailed description. It is intended that all such additional systems, methods, features and advantages be included within this description, be within the scope of the embodiments, and be protected by the following claims and be defined by the following claims. Further aspects and advantages are discussed below in conjunction with the description.

BRIEF DESCRIPTION OF THE DRAWINGS

The system and/or method may be better understood with reference to the following drawings and description. Non-limiting and non-exhaustive descriptions are described with reference to the following drawings. The components in the figures are not necessarily to scale, emphasis instead being placed upon illustrating principles. In the figures, like referenced numerals may refer to like parts throughout the different figures unless otherwise specified.

DETAILED DESCRIPTION

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrases "in another embodiment" or "in further embodiments" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims. Nothing in this section should be taken as a limitation on those claims. Further aspects and advantages are discussed below.

By way of introduction, online information systems place advertisements submitted by advertisers within content services made available to end users, such as web pages, mobile applications ("apps"), TV apps, or other audio or visual content services. The advertisements are provided along with other content. The other content may include any combination of text, graphics, audio, video, or links to such content. The advertisements are conventionally selected based on a variety of criteria including those specified by the advertiser. The advertiser conventionally defines an advertising campaign to control how and when advertisements are made available to users and to specify the content of those advertisements. The content of the advertisements themselves is sometimes referred to as advertising creative or "creatives."

Initiating an advertising campaign conventionally has required a substantial commitment and engagement from an advertiser. This has been especially true for new advertisers who have not previously advertised through the online provider or have not obtained a detailed knowledge of the particular advertising tools. Prospective advertisers need to go through many steps before they can advertise with a new online provider or on a new online product. First, the advertisers need to understand the product and envision how their advertisements would appear to a user in the context of the product. Second, the advertisers need to understand in detail any constraints of the underlying advertisement formats. Third, assuming the advertisers decide to engage the online provider, the advertisers need to develop product-specific campaigns that satisfy the constraints of particular content services.

These steps can involve a substantial time commitment on the part of the prospective advertiser. Understanding the advertising product can take time, even with the assistance of account managers and advertiser tools and information. Deciding how to communicate an advertising message, within the format provided by the advertising product, can take additional time. This is especially true if the prospective advertiser is not experienced in creating advertising campaigns. A prospective advertiser who is experienced running other aspects of a business may not have the skill or expertise to develop and evaluate an advertising campaign.

Further, the prospective advertiser may be unable to reliably judge the likely effectiveness of a campaign. This is especially true in the case of a new advertising product with an unproven return on investment. Given the uncertainty and the time commitment involved, the advertiser may question the value of investing in development of advertising creatives and other inputs for an advertising campaign.

Conventionally, advertisers have relied upon a variety of tools supplied by online providers to create and manage an advertising campaign. These tools have required an advertiser to access web sites of the online provider using a personal computer in order to design and develop new creatives for their campaigns. In addition to the labor intensive nature of these tools, provider's systems also required a significant amount of back-end support and maintenance to consistently meet the needs of the advertisers. The resulting process and inherent overhead results in an unduly burdensome process that was often practical only to advertisers associated with business or commercial entities. Thus, the cost associated with current systems inhibits small, local businesses and personal users from utilizing these tools.

The present description relates generally to an application and related methods and systems for providing cost-effective, targeted advertising campaigns using a smartphone, tablet, other mobile devices, and the like. In its most basic form, the application of the present description includes a user interface that displays broadcasts and/or advertisements (collectively referred herein to as "campaign messages") submitted by businesses or users within a particular geographical range of the user. Additionally, a user may create new campaign messages and specify the parameters, such as targeting or budgeting criteria, associated with their display. In this way, users of mobile devices may access the mobile application to view and/or create new advertisements or broadcasts. Additional embodiments are contemplated in accordance with the present description, and one having ordinary skill in the art would recognize that the systems and methods described herein may be applied to other multimedia platforms, such as social media applications or classified advertising, and the like.

By way of non-limiting example, a mobile phone application may be provided or hosted on a digital application distribution platform, such as those provided by ANDROID® or APPLE®, or any other commercially viable method for distributing of a mobile application. Once downloaded and installed to a mobile device, the application provides users with an interface allowing them to preview localized, global, or otherwise geographically delimited, broadcasts and advertisements directed to a wide range of subject matters, such as product offers, promotions for local events, or other messages having content submitted by businesses and users within the geographical range. The application interface also includes a component for securely verifying the user's identify. Once a user has been identified, the user may view current campaigns or use menu and interface options to create new broadcast or advertising campaigns. As described in further detail herein, the user interface may contain a number of easy-to-use interface elements that guide the user through the process of creating a new campaign, including allowing the user to edit and set customized text fields, such as title or body descriptions, and upload pictures or other image content, which may be stored in the memory of their mobile device.

Additionally, the interface may facilitate the entry of targeting criteria that may allow a user to select specific targeting preferences from a range of options, including, but not limited to, geographic ranges, demographic traits, device or platform type, social factors, and the like. The user may specify one or more targeting characteristics in order to associate a campaign message with a particular geographic location, geographic context, nearby event, or keyword. In accordance with further embodiments described herein, the application may also provide a budgeting module that allows a user to specify various parameters for limiting the presentation of their individual campaigns to a particular time period and/or capped fee amount.

Figure 1:
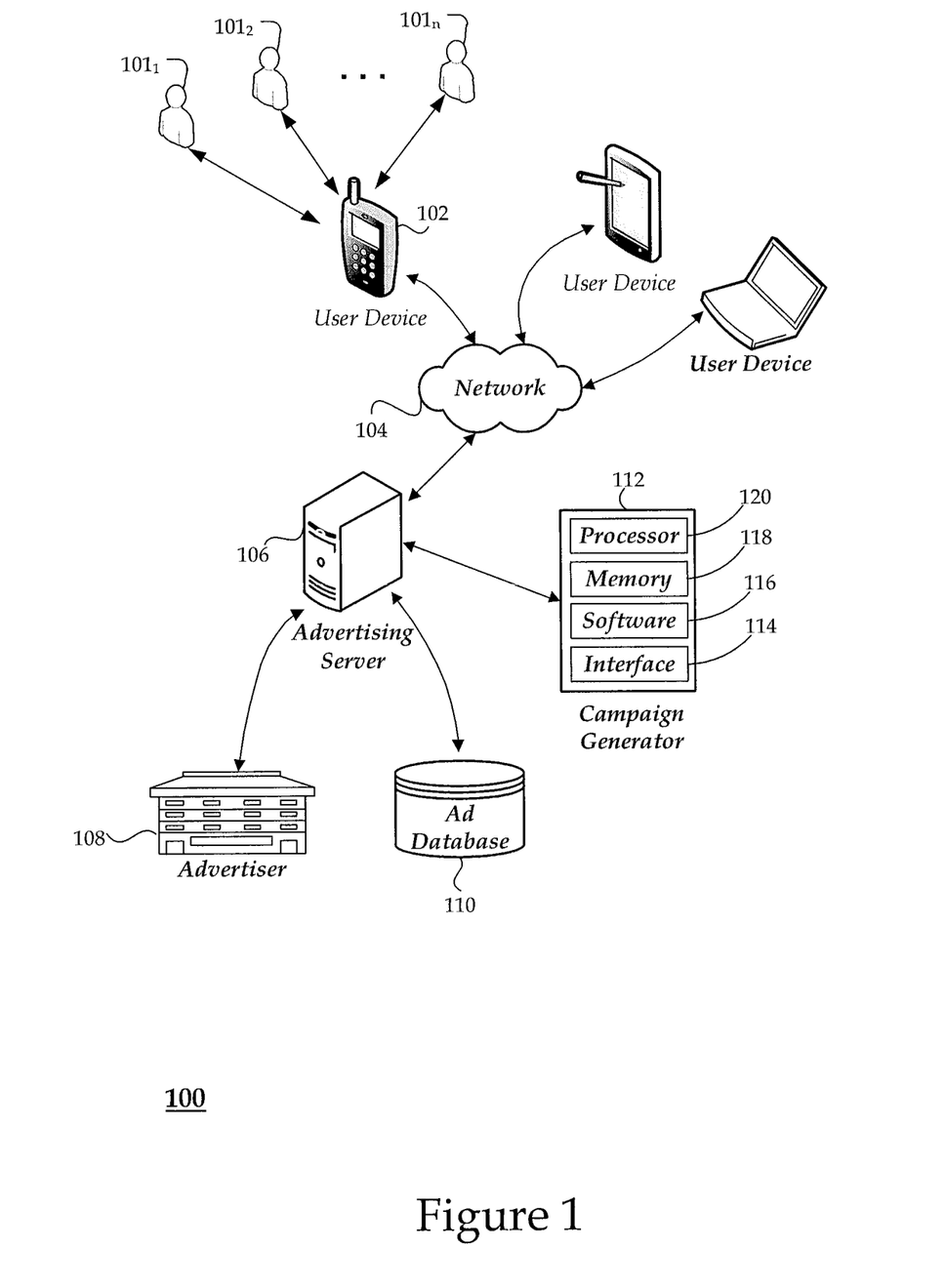
FIG. 1 is a block diagram of an example of a network environment where users may interact with each other.

Referring now to the figures, FIG. 1 depicts a block diagram illustrating one embodiment of an exemplary network system 100. The network system 100 may provide a platform for users to access a mobile application interface for generating advertising or broadcasting campaigns. In the network system 100, a user device 102 is coupled with an advertiser server 106 through a network 104. The advertiser server 106 may be operated by and/or coupled with an advertiser 108, as well as coupled with an ad database 110. A campaign generator 112 may be coupled with the advertiser server 106. Herein, the phrase "coupled with" is defined to mean directly connected to or indirectly connected through one or more intermediate components. Such intermediate components may include both hardware and software based components. Variations in the arrangement and type of the components may be made without departing from the spirit or scope of the claims as set forth herein. Additional, different or fewer components may be provided.

The user device 102 may be a mobile device which allows users 101 to connect to a network 104, such as by accessing the Internet via mobile telephone, tablet computer, or portable computing device. A user 101, which may, for example, be a consumer or an advertiser, may access the API of an advertising system via the network 104. In the preferred embodiment, the user may access the interface via mobile phone application downloaded and stored in the memory of user device 102. In alternative embodiments, the user may use a mobile browser or any similar method for connecting to the interface provided by the advertising server 106 or advertiser 108. The user device 102 may also be referred to as a client device and may include a computing device capable of sending or receiving signals, such as via a wired or a wireless network (e.g., the network 104, which may be the Internet). The user device 102 may, for example, include a portable device, such as a cellular telephone, a smart phone, a display pager, a radio frequency (RF) device, an infrared (IR) device, a Personal Digital Assistant (PDA), a handheld computer, a tablet computer, a laptop computer, a set top box, a wearable computer, an integrated device combining various features, such as features of the forgoing devices, or the like. The user device 102 may vary in terms of capabilities or features, particularly with regard to display size and aspect ratio. The different display sizes and aspect ratios for different user devices may result in an advertisement being rendered differently for those particular user devices. For example, a cell phone may include a numeric keypad or a display of limited functionality, such as a monochrome liquid crystal display (LCD) for displaying text. In contrast, however, as another example, a web-enabled client device may include one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

The user device 102 may include or may execute a variety of operating systems, including a personal computer operating system, such as a WINDOWS®, MAC OS X®, UNIX®, IOS®, or LINUX®, or a mobile operating system, such as IOS®, ANDROID®, or WINDOWS MOBILE®, or the like. The user device 102 may include or may execute a variety of possible applications, such as a client software application enabling communication with other devices, such as communicating one or more messages, such as via email, short message service (SMS), or multimedia message service (MMS), including via a network, such as a social network, including, for example, FACEBOOK®, LINKEDIN®, TWITTER®, FLICKR®, or GOOGLE+®, to provide only a few possible examples. The user device 102 may also include or execute an application to perform a variety of possible tasks, such as browsing, searching, playing various forms of content, including locally stored or streamed video, or games (such as fantasy sports leagues). The foregoing is provided to illustrate that claimed subject matter is intended to include a wide range of possible features or capabilities. As further described herein, the user device 102 accesses the interface of the advertising server 106 in order create and manage campaigns.

In one embodiment, the advertising server 106 or advertiser 108 provides an interface and a method for accessing the interface over network 104 from user device 102. The user device 102 may be configured to access the interface provided by advertiser 108 using a mobile phone application, which may be provided or hosted on a digital application distribution platform, such as those provided by ANDROID® or APPLE®, or any other commercially viable method for distributing the application. In alternative embodiments, a mobile web browser, such as SAFARI®, GOOGLE ANDROID®, CHROME®, or OPERA®, may be used to display the interface, or software programs other than web browsers may also display the interface.

The advertising server 106 may be a web server that provides or serves the user device 102 with application data (including broadcasts, advertisements, campaign data, geographic context data, and social data) that is requested over the network 104, such as by a mobile application running on user device 102. The content provided by the advertising server 106 may be targeted depending on the user 101 that is operating the user device 102, or based on the geographic location of user device 102 as determined from data received from the global-positioning device (GPS) of the user device. The advertising server responsible for serving content to the user device 102 may be the same server or device that hosts the interface for receiving and generating campaign requests, or may be a separate server or component of a distributed environment. The advertising server 106 may be operated by an advertiser 108 that maintains and oversees the operation of the advertising server 106. The advertiser 108 may be any business or operator of an interface that displays campaign messages as part of a user submitted campaign, and may receive payment from the users for display of those campaign messages. Additionally, the advertiser 108 may receive payment from users based on a per view basis, or in accordance with various monetization schemes described herein.

The ad database 110 may be coupled with the advertiser server 106 and may store the current campaigns being managed by the advertiser or data that is provided to the advertiser server 106 from user devices 102 or advertiser 108. The stored data may include, for example, details relating to active or inactive campaigns, contextual information received from third-party sources, such as weather reports, U.S. census data, or product offer information, as well as data based on analysis of the aforementioned types of data, which may be displayed in one or more fields of the user interface on user device 102. The interface provided to the user device 102 may also display one or more third-party advertisements. The advertisements may be displayed on banners within in a mobile application interface or any other method consistent with operation of an ad server. An "ad server" includes a server that stores online advertisements for presentation to users. "Ad serving" refers to methods used to place online advertisements on websites, in applications, or other places where users are more likely to see them, such as during an online session or during computing platform use, for example.

The advertising server 106 may be one or more computing devices which may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary in configuration or capabilities, but generally a server may include one or more central processing units and memory. A server may also include one or more mass storage devices, one or more power supplies, one or more wired or wireless network interfaces, one or more input/output interfaces, or one or more operating systems.

In addition, the advertising server 106 may be or may be part of a content server. A content server may include a device that includes a configuration to provide content via a network to another device. A content server may, for example, host a site, such as a social networking site, or a personal user site (such as a blog, vlog, online dating site, etc.). A content server may also host a variety of other sites, including, but not limited to business sites, educational sites, dictionary sites, encyclopedia sites, wikis, financial sites, government sites, etc. A content server may further provide a variety of services that include, but are not limited to, web services, third-party services, audio services, video services, email services, instant messaging (IM) services, SMS services, MMS services, FTP services, voice over IP (VoIP) services, calendaring services, photo services, or the like. Examples of content may include text, images, audio, video, or the like, which may be processed in the form of physical signals, such as electrical signals, for example, or may be stored in memory, as physical states, for example. Examples of devices that may operate as a content server include desktop computers, multiprocessor systems, microprocessor-type or programmable consumer electronics, etc.

The campaign generator 112 may generate a campaign for displaying advertisements and/or broadcasts in accordance with information received from the user 101 of the mobile interface of user device 102, for example. In addition, the campaign generator 112 may be further configured to generate frames or displays within the interface and populate them with data that allows users to view and interact with campaign messages submitted by other users. In one embodiment, the campaign generator 112 may be controlled by the advertiser 108 and may be a part of the advertising server 106. Alternatively, the campaign generator 112 may be part of a separate entity. The campaign generator 112 may receive data elements from the advertising server 106 that are used to generate a campaign or display data as part of the user interface. Operation of the campaign generator 112 is further described with respect to FIG. 2.

The campaign generator 112 may be a computing device for generating a product or graphic display page with a plurality of visual elements for communicating a campaign message to a user device 102. The campaign generator 112 may include a processor 120, memory 118, software 116, and an interface 114. The campaign generator 112 may be a separate component from the advertising server 106 or may be combined as a single component or device.

The interface 114 may be used to communicate with either the user device 102 or the advertising server 106. The interface 114 may include a user interface and API configured to allow a user and/or administrator to create and manage campaigns or access any functional software module or components of the campaign generator 112. For example, the administrator and/or user may access campaign data related to active or inactive campaigns submitted by users.

The processor 120 in the indexer 112 may include a central processing unit (CPU), a graphics processing unit (GPU), a digital signal processor (DSP) or other type of processing device. The processor 120 may be a component in any one of a variety of systems. For example, the processor 120 may be part of a standard personal computer or a workstation. The processor 120 may be one or more general processors, digital signal processors, application specific integrated circuits, field programmable gate arrays, servers, networks, digital circuits, analog circuits, combinations thereof, or other now known or later developed devices for analyzing and processing data. The processor 120 may operate in conjunction with a software program, such as code generated manually (i.e., programmed).

The processor 120 may be coupled with a memory 118, or the memory 118 may be a separate component. The interface 114 and/or the software 116 may be stored in the memory 118. The memory 118 may include, but is not limited to, computer readable storage media such as various types of volatile and non-volatile storage media, including random access memory, read-only memory, programmable read-only memory, electrically erasable read-only memory, flash memory, magnetic tape or disk, optical media and the like. The memory 118 may include a random access memory (RAM) for the processor 120. Alternatively, the memory 118 may be separate from the processor 120, such as a cache memory of a processor, the system memory, or other memory. The memory 118 may be an external storage device or database for storing recorded ad or user data. Examples include a hard drive, compact disc (CD), digital video disc (DVD), memory card, memory stick, floppy disc, universal serial bus (USB) memory device, or any other device operative to store ad or user data. The memory 118 is operable to store instructions executable by the processor 120.

The functions, acts, or tasks illustrated in the figures or described herein may be performed by the programmed processor executing the instructions stored in the memory 118. The functions, acts, or tasks are independent of the particular type of instruction set, storage media, processor or processing strategy and may be performed by software, hardware, integrated circuits, firm-ware, micro-code, and the like, operating alone or in combination. Likewise, processing strategies may include multiprocessing, multitasking, parallel processing and the like. The processor 120 is configured to execute the software 116. The software 116 may include instructions for generating a product page with a plurality of elements and for monitoring user interaction with that page and the elements.

The interface 114 may be a user input device or a display. The interface 114 may include a keyboard, keypad or a cursor control device, such as a mouse, or a joystick, touch screen display, remote control or any other device operative to interact with the indexer 112. The interface 114 may include a display coupled with the processor 120 and configured to display an output from the processor 120. The display may be a liquid crystal display (LCD), an organic light emitting diode (OLED), a flat panel display, a solid state display, a cathode ray tube (CRT), a projector, a printer or other now known or later developed display device for outputting determined information. The display may act as an interface for the user to see the functioning of the processor 120, or as an interface with the software 116 for providing input parameters.

The present disclosure contemplates a computer-readable medium that includes instructions or receives and executes instructions responsive to a propagated signal, so that a device connected to a network can communicate voice, video, audio, images or any other data over a network. The interface 114 may be used to provide the instructions over the network via a communication port. The communication port may be created in software or may be a physical connection in hardware. The communication port may be configured to connect with a network, external media, display, or any other components in network system 100, or combinations thereof. The connection with the network may be a physical connection, such as a wired Ethernet connection or may be established wirelessly as discussed below. Likewise, the connections with other components of the network system 100 may be physical connections or may be established wirelessly. Any of the components in the network system 100 may be coupled with one another through a network, including but not limited to the network 104. For example, the indexer 112 may be coupled with the advertising server 106 through a network. Accordingly, any of the components in the network system 100 may include communication ports configured to connect with a network, such as the network 104.

The network (e.g. the network 104) may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, or any combination thereof. Likewise, sub-networks, such as may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs. A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example. As described herein, the network 104 may be the Internet, which is merely one example of a network.

A wireless network may couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example. For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

Signal packets communicated via a network, such as a network of participating digital communication networks, may be compatible with or compliant with one or more protocols. Signaling formats or protocols employed may include, for example, TCP/IP, UDP, DECnet, NetBEUI, IPX, Appletalk, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

The network connecting the devices described above (e.g. the network 104) may be a "content delivery network" or a "content distribution network" (CDN). For example, the advertising server 106 may be part of a CDN. A CDN generally refers to a distributed content delivery system that comprises a collection of computers or computing devices linked by a network or networks. A CDN may employ software, systems, protocols or techniques to facilitate various services, such as storage, caching, communication of content, or streaming media or applications. Services may also make use of ancillary technologies including, but not limited to, "cloud computing," distributed storage, DNS request handling, provisioning, signal monitoring and reporting, content targeting, personalization, or business intelligence. A CDN may also enable an entity to operate or manage another's site infrastructure, in whole or in part.

Likewise, the network connecting the devices described above (e.g. the network 104) may be a peer-to-peer (or P2P) network that may employ computing power or bandwidth of network participants in contrast with a network that may employ dedicated devices, such as dedicated servers, for example; however, some networks may employ both as well as other approaches. A P2P network may typically be used for coupling nodes via an ad hoc arrangement or configuration. A peer-to-peer network may employ some nodes capable of operating as both a "client" and a "server." For example, the advertising server 106 may provide advertisements and/or content to the user device 102 over a P2P network, such as the network 104.

The advertising server 106, the ad database 110, the indexer 112, and/or the user device 102 may represent computing devices of various kinds. Such computing devices may generally include any device that is configured to perform computation and that is capable of sending and receiving data communications by way of one or more wired and/or wireless communication interfaces, such as interface 114. The present disclosure contemplates the use of a computer-readable medium that includes instructions or receives and executes instructions responsive to a propagated signal, so that any device connected to a network can communicate voice, video, audio, images, or any other data over a network.

Not all of the depicted components in FIG. 1 may be in every system, however, and some implementations may include additional components not shown in the figure. Variations in the arrangement and type of the components may be made without departing from the spirit or scope of the claims as set forth herein.

Figure 2:
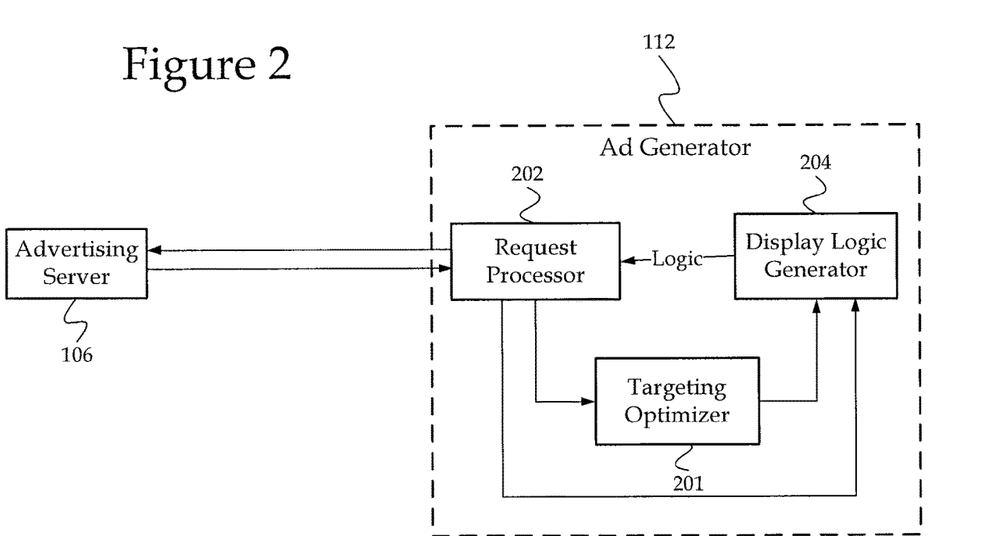
FIG. 2 is a block diagram of an exemplary ad generator according to a specific embodiment.

Referring now to FIG. 2, FIG. 2 is a block diagram of an exemplary ad generator 112. The ad generator 112 may include a request processor 202, which may include or be the same as the processor 120 discussed in connection with FIG. 1. The ad generator 112 may further include a display logic generator 204 and/or a target optimizer 201. The advertising server 106 may provide the ad generator 112 with access to data stored in ad database 108, relating to active and inactive campaigns, as well as data relating user requests for new or modified campaigns. The request processor 202 may receive data regarding the campaign, or individual campaign message, from advertising server 106 in order to generate display logic relating to the graphical representation of various interface elements, including user submitted campaign messages. The request processor 202 may analyze the data sent from advertising server 106, communicate the data to the display logic generator 204, which may generate logic used to create the graphical representations of the campaign data. In one embodiment, the display logic generator 204 may use predefined templates to generate graphical representations of each campaign message. The display logic generator 204 may identify one or more template components relating to a particular category or keyword for the campaign. For example, if the campaign contained text relating to a sporting event, the display logic generator 204 may use a sporting themed template to generate the campaign message.

In alternative embodiments, the display logic generator 204 may dynamically generate display logic using a number of pre-programmed design criteria, such as criteria relating to the type and subject matter of the broadcast or advertisement. Display logic may be dynamically generated from data extracted from the user's account registration, such as gender, age, or other demographic traits or from information specified in the user's campaign request submission. In certain embodiments, display logic may be influenced or generated based on data related the campaign request, such as past performance of similar campaigns, the geographic location of the campaign, and any geographical contextual data that may be available for that location, including data received from third-party sources, such as weather reports, U.S. census data, or data pertaining to nearby events.

In one embodiment, the ad generator 112 may use the targeting optimizer 201 to generate data allowing targeted campaign messages. The targeting optimizer 201 may use a geographically sensitive algorithm to optimize the campaign performance or performance of each campaign message. For example, the targeting optimizer may optimize campaign performance based on data relating to performance of active or inactive campaigns, contextual information received from third-party sources, such as weather reports, U.S. census data, local event data, or product offer information, or social factors relating to targeted users of campaign. Additionally, targeting optimizer 201 may communicate with, or be the same component as, bidding server 300 and may consider data in connection monetization schemes as further described below in connection with FIG. 3.

Figure 3:
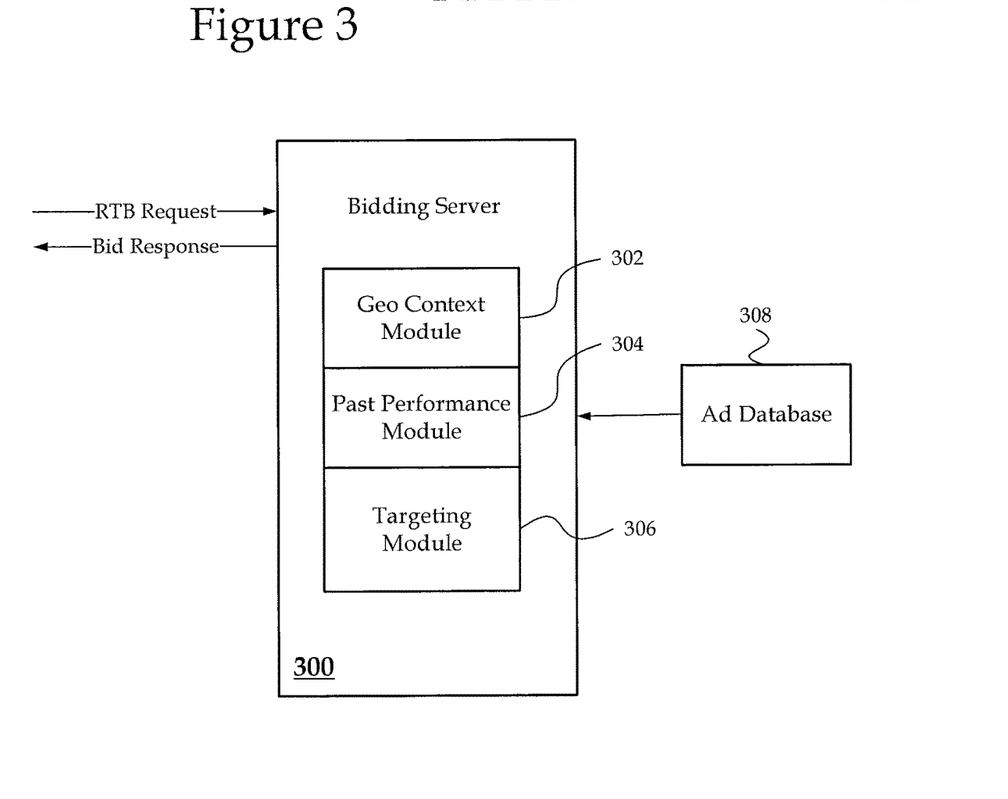
FIG. 3 is a block diagram of an exemplary bidding server according to a specific embodiment.

FIG. 3 is a block diagram of an exemplary bidding server 300. Bidding server 300 may be a separate component of advertising server 106 or ad generator 112, or may be combined with a combination thereof as a single component or device. Bidding server 300 is in operative communication with the interface supply side of the system. The bidding system 300 is responsible for generating and analyzing bid impressions on behalf of users or advertisers based on both campaign performance and budgeting criteria. Bidding system 300 may work in conjunction with, or in addition to, targeting optimizer 201 to ensure efficient bid impressions are generated and presented to users when creating a new campaign or viewing their active campaigns. The user 101 can interact with the bidding server 300 via the advertising server 106 in order to send real time bidding (RTB) requests to bidding server 300. Bidding sever 300 receives and processes RTB requests using data supplied by both the user and third-party sources in order to provide impression feedback on actual and projected campaign efficiency.

Bidding server 300 may include one or more modules for optimizing campaign efficiency based on various data sources, such as, for example, geo context module 302, past performance module 304, and targeting module 306. Geo context module 302 may receive geographic data specified by a user 101 and relating to a targeted geographic region for a particular campaign, or may receive geographic data from the user device 102 based on the geographic location of the user device 102, such as determined from data received from the device's GPS or via triangulation. Additionally, geo context module 302 may receive data from a variety of data sources, such as third-party marketers, U.S. census data, national or local weather services, or local event services. Past performance module 304 may be configured to store and/or read data stored in ad database 308 relative to both active and inactive campaigns. Ad database 308 may be the same entity as ad database 110 or may be a separate component or device. Past performance module 304 may be configured to read data from ad database 308 to analyze data and generate feedback relating to the efficiency of current and/or past campaigns that may relate to the efficiency of a new campaign being created by the user. Targeting module 306 may include a variety of additional targeting criteria, some or all of which may be specified by the user, or may be determined based on metadata or contextual data read from the devices of various users of the system and/or their device operating history. Targeting module 306 may also employ demographic characteristics (e.g., age, income, sex, occupation, etc.), or social characteristics (e.g., social connections, user interactions, or data from social media sites) for predicting user behavior. This data may be used to develop profiles specific to one or more users, or a group of users, and may be generated to model user behavior. A correlation may be identified, such as for user views of campaigns, for example. An identified correlation may be used to target potential users or provide further feedback on campaign efficiency.

Using data gathered from one or more of the above mentioned modules, bidding server 300 may generate efficient bid impressions on behalf of users and advertisers to provide the user with feedback on the likely success of a campaign. In one embodiment, bidding server 300 can analyze the parameters specified by the user when creating the campaign in order to determine likely success rate of a campaign based on the targeting and/or budgeting criteria provided. In alternate embodiments, bidding server 300 may utilize data from one or more of the aforementioned modules in order to select from among various competing bids and to choose a particular broadcast or advertisement to display to a particular user device.

A variety of monetization schemes are contemplated and consistent with the scope of the current description. By way of non-limiting example, the bidding server 300 may employ a "real money" budgeting system where a user may pre-load their account with campaigns budgeting funds, or the system operator may charge a fee based on the number of a variety of types of impressions, such as click-through-rate, likes, comments, or campaign views. At periodic points during the campaign's run life, the system may debit the user's account with a fee corresponding to the monetization scheme. Alternatively, the system may employ a "points" or "credits" based system. Additionally, the mobile application interface may display third-party advertising banners on user devices, or include sponsored advertising, non-sponsored advertising, guaranteed and non-guaranteed delivery advertising, ad networks/exchanges, ad targeting, ad serving, and/or ad analytics. Various monetization techniques or models may be used in connection with sponsored advertising, including advertising associated with user search queries, or non-sponsored advertising, including graphical or display advertising. In an auction-type online advertising marketplace, advertisers may bid in connection with placement of advertisements, although other factors may also be included in determining advertisement selection or ranking. Bids may be associated with amounts advertisers pay for certain specified occurrences, such as for placed or clicked-on advertisements, for example. Advertiser payment for online advertising may be divided between parties including one or more publishers or publisher networks, one or more marketplace facilitators or providers, or potentially among other parties.

Some models may include guaranteed delivery advertising, in which advertisers may pay based at least in part on an agreement guaranteeing or providing some measure of assurance that the advertiser will receive a certain agreed-upon amount of suitable advertising, or non-guaranteed delivery advertising, which may include individual serving opportunities or spot market(s), for example. In various models, advertisers may pay based at least in part on any of various metrics associated with advertisement delivery or performance, or associated with measurement or approximation of particular advertiser goal(s). For example, models may include, among other things, payment based at least in part on cost per impression or number of impressions, cost per click or number of clicks, cost per action for some specified action(s), cost per conversion or purchase, or cost based at least in part on some combination of metrics, which may include online or offline metrics, for example.

During presentation of advertisements, a presentation system may collect descriptive content about types of advertisements presented to users. A broad range of descriptive content may be gathered, including content specific to an advertising presentation system. Advertising analytics gathered may be transmitted to locations remote to an advertising presentation system for storage or for further evaluation. Where advertising analytics transmittal is not immediately available, gathered advertising analytics may be stored by an advertising presentation system until transmittal of those advertising analytics becomes available A process of buying or selling online advertisements may involve a number of different entities, including advertisers, publishers, agencies, networks, or developers. To simplify this process, organization systems called "ad exchanges" may associate advertisers or publishers, such as via a platform to facilitate buying or selling of online advertisement inventory from multiple ad networks. "Ad networks" refers to aggregation of ad space supply from publishers, such as for provision en masse to advertisers. The bidding and advertising system described in relation to FIG. 3 is non-limiting and non-exhaustive, and a variety of monetization schemes may be used which fall within the true spirit and scope of the present invention.

Figure 4:
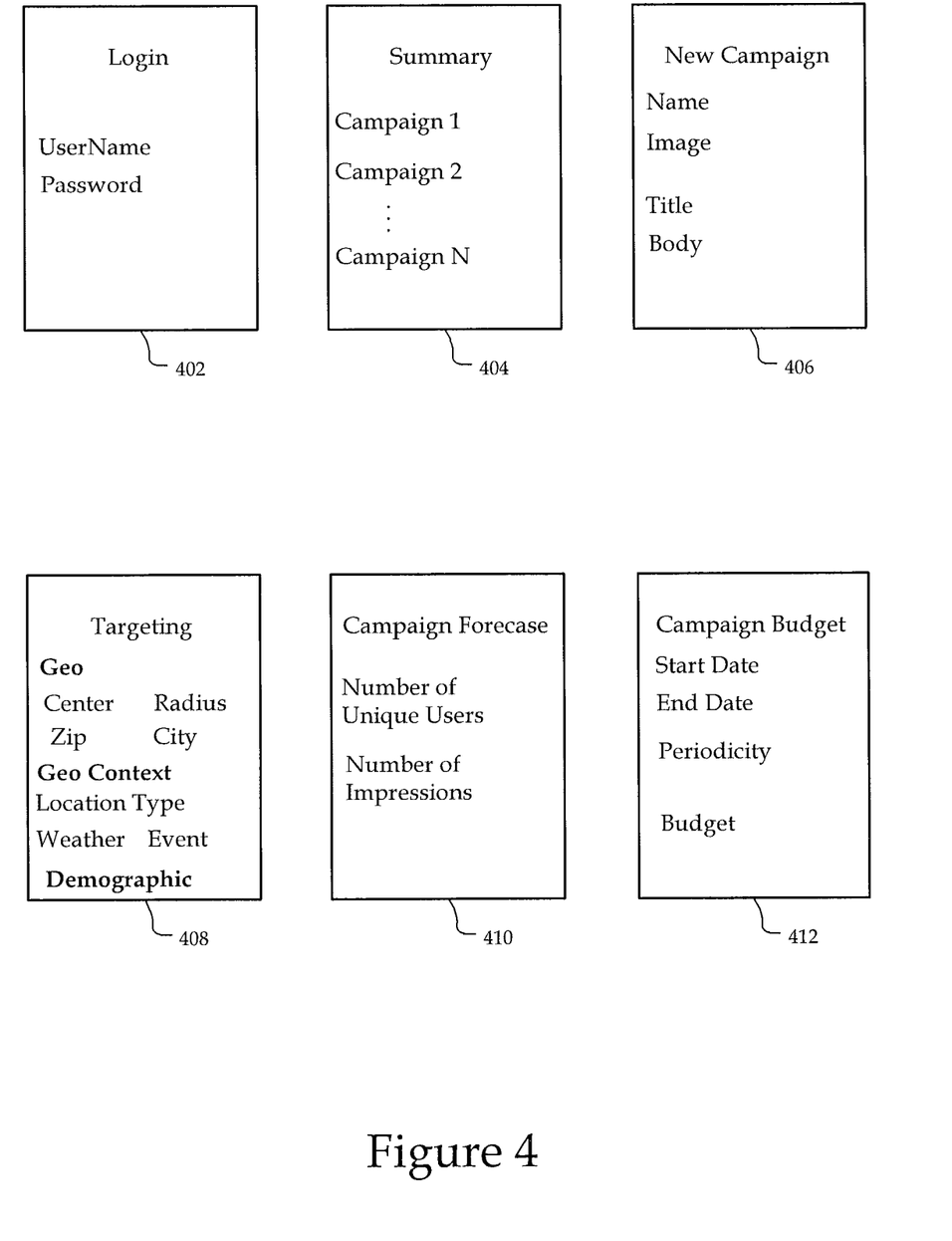
FIG. 4 are exemplary diagrams of displays for implementing a mobile application interface to allow creation and submission of new advertising or messaging campaigns.

Referring now to FIG. 4, exemplary diagrams are illustrated of displays for implementing a mobile application interface to allow creation and submission of new advertising or messaging campaigns are shown. At display 402, a user of the system in accordance with one embodiment is presented with a login page where the user may enter authentication parameters associated with their user account. Additionally, the user may be provided with an opportunity to sign up for or create a new account. At display 404, the user may initially be provided a display showing one or more active campaigns of various users. The user may sort campaigns by a variety of sorting options, including top trending broadcasts or advertisements, personal ads, sports-related messages, politics, etc. The user may also browse their own active and inactive campaigns previously created by the user in order to view campaign views, comments, likes, efficiency, status, and/or remaining budget, as well as to pause, stop, or otherwise discontinue campaigns currently in progress.

At display 406, the user is presented with the option of creating a new campaign. The user may specify data relating to the new campaign, such as the name of the campaign, an image associated with the campaign (e.g., from the memory store of the mobile device, or a URL link to an image), and/or text to be displayed with each broadcast or advertisement in the campaign. Also at display 406, the user may be presented with an interface option allowing the user to opt to enter targeting, sponsor, or budgeting information. If the user desires to enter targeting information, the user is presented with display 408 providing various options for specifying targeting criteria. For example, the user may enter geographical data in order to limit the campaign messages to be being displayed to a particular geographic region, such as by specifying a certain radius from a center location, zip code, or city. Additionally, the user may associate various geographical contextual data with the campaign message such as location type (e.g., coffee shops, malls, urban areas), weather patterns (e.g., rain, sun, snow), or events (e.g., concerts, sales, sports games). In this way, the user may limit display of the campaign messages to other user devices that are located in geographic proximity to or otherwise have characteristics corresponding to the specified contextual data. The user may further specify demographic targeting information, including demographic characteristics (e.g., age, income, sex, occupation, etc.), or social characteristics (e.g., social relations, user interactions, or data from social media sites), that may limit display of messages in the same manner.

At display 410, the user may be provided with a prediction forecast of the likely success rate of the campaign according to the targeting criteria specified in connection with display 408. In one embodiment, a prediction module, such as those may be provided in conjunction with targeting optimizer 201 and/or bidding server 300, may use machine learning techniques to provide feedback on likely effectiveness of a campaign. For example, a machine learning algorithm may data mine information stored in databases, such as ad database 308 or ad database 110, to analyze and predict effectiveness of active and inactive campaigns, and to generate appropriate functions and classifiers for predicting user behavior. Prediction modules can be implemented using various machine learning algorithms, including, but not limited to, decision tree learning, association rule learning, inductive logic programming, clustering, Bayesian networks, and the like.

At display 412, the user may set the operation parameters for the campaign and set the overall campaign budget. For example, for any particular campaign, the user may desire to specify a start date and an end date. The user may also specify a periodicity or time frame for how often a campaign message may be displayed to a same user, or to all users collectively. Additionally, the user may set a budget for a particular campaign. The features of the budget may change depending on the type of monetization scheme implemented for the mobile application. As described further in connection with FIG. 3 above, the monetization format may be allow a user to specify an amount of real money or points and/or credits to be used for a particular campaign. Once created, the user can view the amount of the budget remaining for each of the user's active campaigns by viewing the campaign summary page in connection with display 404. The displays described in connection with FIG. 4 are exemplary and non-limiting. Various other displays are contemplated which fall within the true spirit and scope of the present invention, and the interface may be extendable to facilitate applications in fields such as classified advertising social networking, to name a few.

Figure 5:
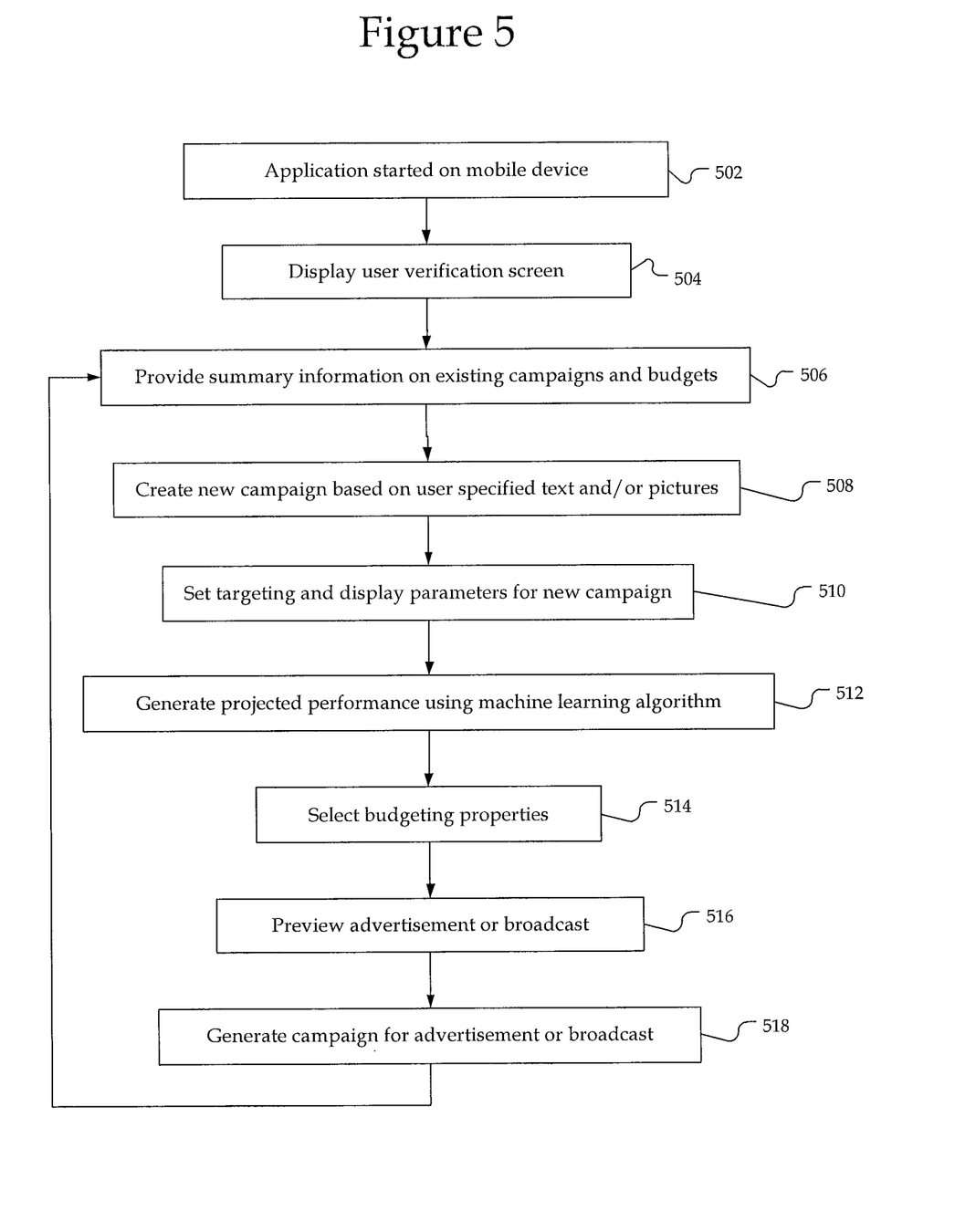
FIG. 5 is a flow diagram of an exemplary method for implementing a mobile application interface to allow creation of new advertising or messaging campaigns.

Referring now to FIG. 5, a flow diagram of an exemplary method for implementing a mobile application interface to allow creation of new advertising or messaging campaigns is illustrated. At outset of block 502, the user has downloaded the application from a mobile application distribution platform and installed the application on their mobile device. In block 502, the user starts the application on their mobile device by, for example, selecting an icon associated with the application. Optionally, once the application is started, a listing of current broadcasts or advertisements submitted by other users as part of their own campaigns may be displayed in interactive format to the user. In one embodiment, the user can select various categories of broadcasts or advertisements to limit the viewable campaigns to ads or broadcasts of a certain type (e.g., top or trending broadcasts, business ads, events, politics, or personal ads, such as dating). The user interface may also indicate the number of views, clicks, or likes, that each of the broadcasts or advertisements has received.

At block 504, a user verification screen is displayed, which allows a user create a user account, or, if the user already owns an account, to log into their existing account. At block 506, once logged into their account, the user may browse active campaigns by other users or may display a summary of the user's own active and inactive. As described in connection with FIG. 4, this may include information related to how many views and clicks the user's campaigns have received, or how much of the campaign budgets are remaining. At block 508, the user may use the interface options to create new broadcast or advertising campaigns. As described in connection with FIG. 4, the user interface may contain a number of easy-to-use interface elements that guide the user through the process of creating a new campaign, including allowing the user to edit and set customized text fields, such as title or body descriptions, and upload pictures from the memory of their mobile device. Additionally, at block 510, the user may specify targeting criteria that allows a user to select specific targeting preferences from a range of options, including geographic ranges, demographic traits, device or platform type, and the like. The user may also specify one or more targeting characteristics in order to associate the campaign with a particular event or keyword. At block 512, the system may employ a machine learning algorithm to analyze the campaign's effectiveness by comparing the targeting criteria and campaign data to active and inactive campaigns. The system may generate and display statistical information relating to the campaign and provide the user with an opportunity to revise different selected options.

At block 514, the user may select one or more budgeting properties. As explained further in connection with FIG. 3, the user may select from a variety of different funding options, such as real money or from a point-based system.

Additionally, at block 514, the user may specify running parameters for the particular campaign, such as periodicity, start and end time, and budget cap. At block 516, the user may preview the advertisement or broadcast according the options the user has selected. Optionally, at block 516 the user may also be provided with forecasting details predicting the campaigns effectiveness based on information budgeting and targeting criteria provided by the user as well as by the system's prediction modules and machine learning algorithm. At block 518, the user may approve the campaign parameters and the system generates a campaign for the broadcast or advertisement. In one embodiment, the system may use ad generator 112 as described in connection with FIG. 2 to generate the display logic for the advertisement or broadcast.

Figure 6:
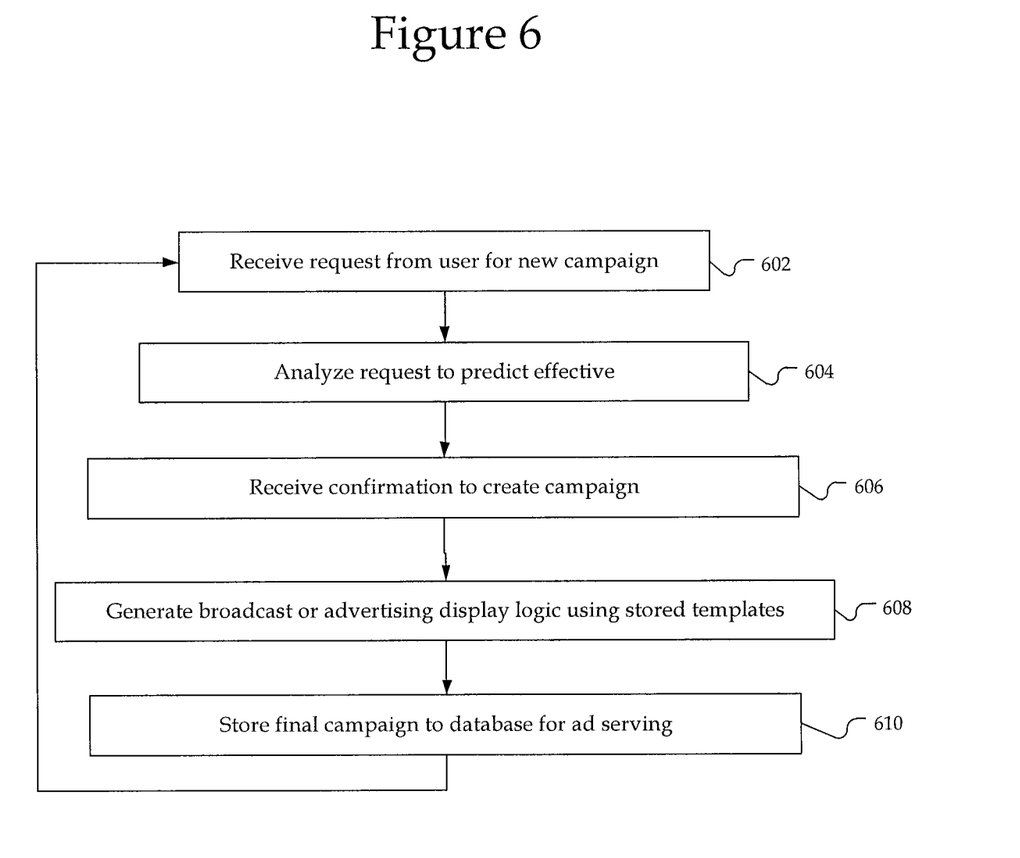
FIG. 6 is a flow diagram of an exemplary method for generating an advertisement or broadcast from campaign information.

FIG. 6 is a flow diagram of an exemplary method and back-end system for generating an advertisement or broadcast from campaign information. In one embodiment, a distributed ad serving platform or server may implement the mobile interface and receive requests from users to create campaigns, such as via an API. At block 602, the platform receives a request from a user for a new campaign. At block 604, the platform analyzes the request to determine the likely effectiveness of the campaign given the user-specified data and data stored in databases of the distributed system. At block 606, the platform receives confirmation to create the campaign according to the specified campaign characteristics. At block 608, the platform generates the broadcast or advertising display logic. In one embodiment, the platform may use templates stored within the platform databases to create the broadcast or advertisement. In alternative embodiments, the platform may dynamically generate display logic using a number of pre-programmed design criteria, such as criteria relating to the type and subject matter of the broadcast or advertisement. For example, the platform may use a sports template or generate logic relating to a sports game when a user broadcasts a message or advertisement relating to a local sporting event. At block 610, the platform stores the final campaign to a database where it may be accessed by the platform for ad serving in accordance with the parameters specified by the user during the creation and budgeting steps.

Figure 7:
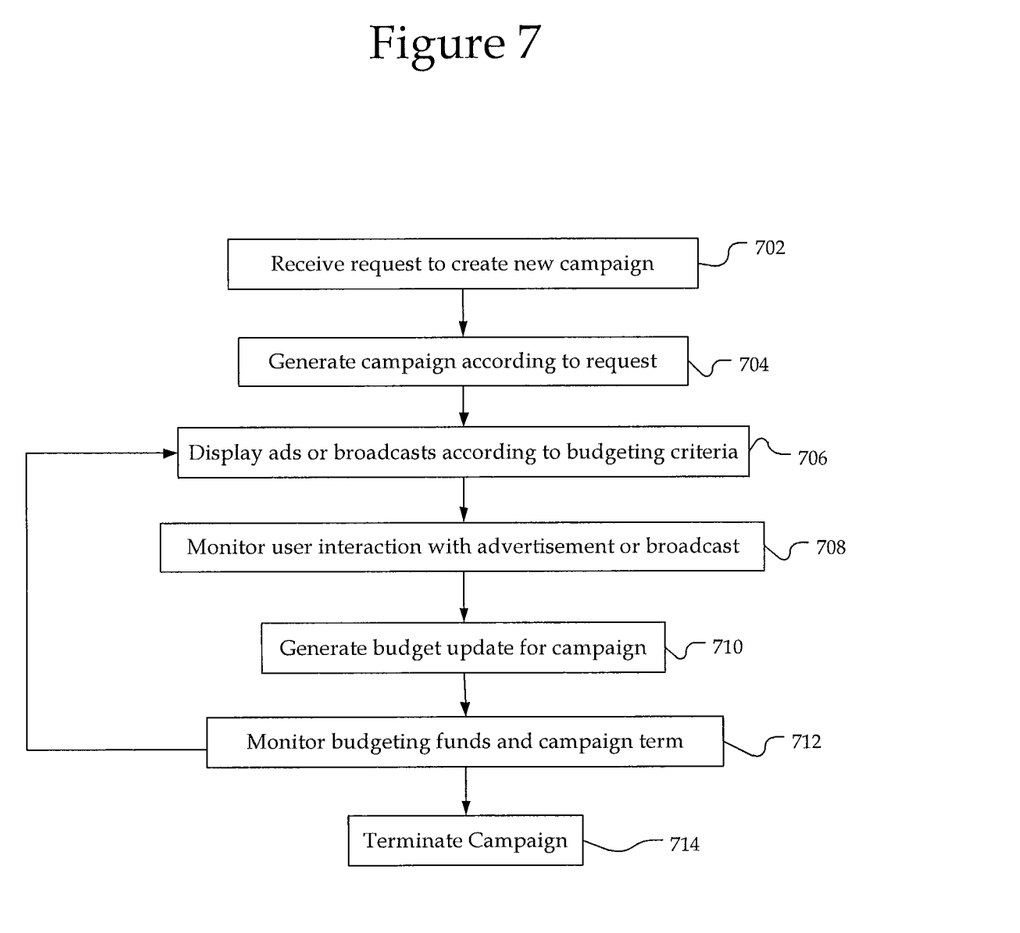
FIG. 7 is a flow diagram of an exemplary method for implementing a bidding server for monetizing campaigns.

FIG. 7 is a flow diagram of an exemplary method for implementing a bidding server for monetizing campaigns. At block 702, a request to create a new campaign is received from a user of the mobile interface. At block 704, a campaign message is generated according the user request. As further explained in connection with FIGS. 3-5, the user may specify a variety of display parameters and budgeting criteria. At block 706, the system displays the campaign messages to users of the system in accordance with the parameters specified in each campaign. In various embodiments, the cost of each campaign may be a flat-rate fee or may be related to the number or views or clicks an advertisement or broadcast receives. In one embodiment, at block 708, the system may monitor user interaction with an advertisement or broadcast. The user interactions may be used to determine budgeting fees for the campaign message, which can in turn be applied against the campaign's remaining budget. In additional embodiments, the user interaction data may be stored in a database and used by a prediction module when forecasting the likely success of a campaign. In block 710, the system updates the remaining budget for a particular campaign according to monetization scheme employed by the system. As further described in connection with FIG. 3, the system may employ a real money system or may employ "points" or "credits" system. In block 712, the system monitors the remaining budget for the campaign as well as any user specified criteria for the campaign, such as an end date. If the balance of the campaign budget is positive, the system may return to block 706 where the broadcast or advertisement may again be displayed according to the user selected parameters. If the budget has been depleted or the campaign has reached the end of its term, the campaign terminates at block 714.

In alternative embodiments, the methods described in FIGS. 5 through 8 may include one or more additional steps, may omit certain steps, or may perform the steps in a different order. The appended claims are intended to cover all such modifications, enhancements, and other embodiments, which fall within the true spirit and scope of the present invention.

The above disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description. While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A system for providing mobile application-based online advertising comprising:

a database configured to store data corresponding to a plurality of visual elements for rendering one or more advertisements;

an advertising server having at least a processor which executes program codes stored in a memory to configure the advertising server in operative communication with the database and configured to receive a request for creation of an advertisement campaign from a mobile user device as an advertiser, wherein the advertisement campaign is guaranteed to receive an agreed-upon advertisement performance as one of one or more metrics resulting from the advertisement campaign;

a mobile interface configured to receive a submission of geographical targeting criteria from the mobile user device relating to the advertisement campaign to the advertising server, wherein via the geographical targeting criteria the mobile user device specifies a first location type and a first event; and a campaign generator of the advertising server configured to select from the plurality of visual elements and generate display logic for displaying the plurality of visual elements and an advertisement corresponding to the advertisement campaign;

the advertising server configured to:
receive geographical location data, from a second user device, comprising a current location of the second user device;

determine, based on the geographical location data, a second location type associated with the second user device;

determine, based on the geographical location data, a second event associated with the second user device;

determine that the second user device is within a range specified by the geographical targeting criteria based on (i) a determination that the first location type specified in the geographical targeting criteria received from the mobile user device matches the second location type associated with the second user device and (ii) a determination that the first event specified in the geographical targeting criteria received from the mobile user device matches the second event associated with the second user device;

target one or more devices, comprising the second user device, to receive the advertisement corresponding to the advertisement campaign, wherein the advertising server uses a geographically sensitive algorithm to optimize the targeting; and render charges to the advertisement campaign based on a metric associated with the agreed-upon advertisement performance.

2. The system of claim 1, wherein the first location type specified in the geographical targeting criteria comprises at least one of a coffee shop, a mall or an urban area.

3. The system of claim 1, wherein via the geographical targeting criteria the mobile user device specifies a sports game as the first event.

4. The system of claim 1, wherein via the geographical targeting criteria the mobile user device specifies a concert as the first event.

5. The system of claim 1, wherein via the geographical targeting criteria the mobile user device specifies one or more weather patterns, and the determining that the second user device is within the range specified by the geographical targeting criteria is based on one or more weather reports.

6. The system of claim 1, comprising a bidding engine configured to receive advertiser bids for advertisements.

7. The system of claim 6, wherein the bidding engine comprises a targeting component to provide feedback on an estimated efficiency of the advertisement campaign.

8. The system of claim 6, wherein the bidding engine comprises a geographic context module configured to process one or more advertiser bids specifying a plurality of contextual targeting criteria for limiting a display parameter for displaying at least one advertisement, wherein the plurality of contextual targeting criteria comprises one or more of an address, a city, a zip code, a state, a location and a radius, a sporting event, a mobile platform, a device-type, a demographic trait, or a social media relation.

9. The system of claim 1, wherein the optimizing the targeting using the geographically sensitive algorithm is based on at least one of data relating to performance of active campaigns, data relating to performance of inactive campaigns, contextual information received from third-party sources comprising at least one of weather reports, census data, local event data, or product offer information, or social factors relating to targeted users of one or more campaigns.

10. The system of claim 1, wherein the determining that the second user device is within the range specified by the geographical targeting criteria is based on census data.

11. A system comprising:

a database configured to store data corresponding to a plurality of visual elements for displaying content;

a server having at least a processor which executes program codes stored in a memory to configure the server in operative communication with the database and configured to receive a request for a broadcast campaign over a network from a user device, wherein the campaign is associated with a content performance metric;

an interface configured to receive a geographical targeting criteria from the user device, the geographical targeting criteria relating to the campaign, wherein the geographical targeting criteria specifies a first location type and a first event; and a generator module configured to select one or more visual elements from the plurality of visual elements and generate display logic for the one or more visual elements and first content corresponding to the campaign;

the server configured to:

receive geographical location data, from a second user device, comprising a current location of the second user device;

determine, based on the geographical location data, a second location type associated with the second user device;

determine, based on the geographical location data, a second event associated with the second user device;

determine that the second user device is within a range specified by the geographical targeting criteria based on (i) a determination that the first location type specified in the geographical targeting criteria received from the user device matches the second location type associated with the second user device and (ii) a determination that the first event specified in the geographical targeting criteria received from the user device matches the second event associated with the second user device;

target one or more devices, comprising the second user device, to receive the first content corresponding to the campaign, wherein the server uses a geographically sensitive algorithm to optimize the targeting; and render charges to the campaign based on the content performance metric.

12. The system of claim 11, wherein the campaign comprises a broadcast campaign.

13. The system of claim 11, wherein the campaign comprises an advertisement campaign.

14. The system of claim 11, wherein the first content comprises at least one of a user broadcast or an advertisement.

15. The system of claim 11, comprising at least one module receiving a budgeting cap for limiting the generation of the display logic.

16. A computer-implemented method, comprising:

providing a mobile interface for submission of data related to an advertisement campaign from a mobile user device, the data comprising a present geographical location of the mobile user device and a targeting criteria specifying a first location type and one or more weather patterns;

generating an advertisement based on the data from the mobile user device, wherein the advertisement campaign is guaranteed with some measure of assurance to receive an agreed-upon advertisement performance metric resulting from the advertisement campaign;

storing the advertisement and the data related to the advertisement campaign in an advertising server database of an advertising server having a plurality of advertisement campaigns;

determining that a plurality of target mobile user devices match the targeting criteria based on a determination that the first location type specified in the targeting criteria matches one or more location types associated with the plurality of target mobile user devices;

selecting, from the advertising server database, one or more advertisements to be served to the plurality of target mobile user devices based on the targeting criteria associated with the advertisement campaign, geolocations of the plurality of target mobile user devices, one or more weather reports and census data;

serving the one or more advertisements over a network to the plurality of target mobile user devices; and charging the advertisement campaign based on a metric associated with the agreed-upon advertisement performance.

17. The method of claim 16 wherein the mobile user device comprises one of a mobile telephone, a tablet computer, a personal digital assistant, or a portable computer.

18. The method of claim 16, wherein the one or more advertisements are served according to a geographically sensitive algorithm.

19. The method of claim 16, wherein selecting the one or more advertisements comprises selecting at least one advertisement of the one or more advertisements based on a budgeting cap associated with the advertisement campaign.

20. The method of claim 16, wherein the first location type specified in the targeting criteria comprises at least one of a coffee shop, a mall or an urban area.

* * * * *